3,227,277
METHOD FOR ELUTRIATION SEPARATION
John F. Boyle, Norwood, and Karlton J. Hickey, Broomall, Pa., assignors to The Atlantic Refining Company, Philadelphia, Pa., a corporation of Pennsylvania
No Drawing. Filed Apr. 11, 1962, Ser. No. 186,625
4 Claims. (Cl. 209—158)

This invention relates to improvements in the aqueous elutriation separation of particles of a silica-alumina cracking catalyst from admixture with particles of a cation exchange resin and, more particularly, it relates to the improvement consisting of degassing the aqueous medium prior to its use for the elutriation separation of the catalyst particles from the resin particles. In a specific embodiment of the invention, the aqueous medium employed for elutriation separation of silica-alumina cracking catalyst particles from cation exchange resin particles is degassed prior to being used for elutriation and thereby the temperature of the aqueous medium is controlled simultaneously.

It has been known for many years that small quantities of metallic contaminants deleteriously affect the product distribution characteristics of silica-alumina cracking catalysts. When silica-alumina catalysts came into commercial use for the catalytic cracking of various hydrocarbon charge stocks it was found that when such stocks were contaminated with metal contaminants these would be deposited on the silica-alumina catalyst and thereby change the product distribution characteristics of the catalyst. Thus, instead of converting the hydrocarbon charge into the desired gasoline boiling range and furnace oil boiling range products, the catalyst would produce large quantities of normally gaseous hydrocarbons and coke with a consequent loss of desired gasoline and furnace oil products. The metal contaminants deposited on the silica-alumina catalyst during the cracking cycle are not removed during the subsequent regeneration cycle wherein the coke is burned from the catalyst, accordingly, the metal contaminants accumulate on the catalyst until it has to be discarded.

Various methods have been proposed either for negating the effect of the metal contaminants or for removing them from the catalyst. One such method involves the utilization of cation exchange resins for the removal of the metallic contaminants. In this process the particles of the silica-alumina catalyst which have become contaminated with metals during use in the cracking of hydrocarbons are contacted with particles of a cation exchange resin in an aqueous medium. The metallic contaminants are transferred from the silica-alumina catalyst to the cation exchange resin during the contacting step.

In order to utilize the purified catalyst and reuse the resin, it is necessary to separate the catalyst particles from the resin particles. The method employed commercially involves elutriation with water. The separation is carried out by contacting the mixture of catalyst particles and resin particles while in an aqueous medium with an ascending aqueous stream in a tower. The velocity of the ascending aqueous stream is controlled so that the catalyst particles which have a slower settling rate in water than the settling rate of the resin particles are caused to move upwardly and are subsequently removed from the top of the tower. The velocity of the ascending aqueous stream is less than the settling rate of the resin particles, however, so that these settle and are removed from the bottom of the tower.

The contacting of the catalyst particles with the resin particles may be carried out in an aqueous medium at temperatures somewhat above room temperature, but temperature, of from about 120° F. to 250° F. are preferred and temperatures of from 200° F. to 212° F. are most preferred. In order to avoid subjecting the resin particles to wide variations in temperature, i.e. thermal shock, which causes them to crack and split, the elutriation separation is carried out at about 150° F. when the contacting is carried out at about 212° F. It was found that when the water which was to be used for elutriation was heated from room temperature to 150° F. it released dissolved gases which formed into bubbles. These bubbles selectively attached themselves to resin particles with the result the resin particles did not settle, but were carried upwardly with the catalyst particles. Moreover, frequently these solid particles served as nuclei for the formation of the gas bubbles with the same result.

It was found that this difficulty could be overcome by degassing the water prior to using it for elutriation so that gas bubbles would not form in the aqueous stream at the temperature and pressure employed for the elutriation and that such degassing could be employed to control the temperature of the water to be used for elutriation.

It is an object of this invention to provide a method for preventing gas formation in the aqueous stream employed for the elutriation separation of silica-alumina catalyst particles from cation exchange resin particles.

It is another object of this invention to provide a method for preventing gas formation in the aqueous stream employed for the elutriation separation of silica-alumina catalyst particles from cation exchange resin particles and also control the temperature of the aqueous medium simultaneously.

Other objects will be apparent from the description and claims that follow.

In accordance with one embodiment of this invention, the water which is to be used in the elutriation separation of silica-alumina catalyst particles from admixture with cation exchange resin particles is degassed prior to use, the degassing being in an amount such that the amount of gas remaining in the water is insufficient to form and release gas bubbles at the temperature and pressure employed in elutriation.

The degassing of the water may be carried out by heating the water to a temperature at least about 5° F. above the temperature and at the pressure to be employed during elutriation and holding the water at this temperature for a sufficiently long period of time such that the dissolved gases in the water will be released and reach equilibrium pressure with the external pressure. Normally this time will range from 15 to 30 minutes. The water is then cooled to the elutriation operating temperature and used, care being taken to prevent re-dissolving gases into the water during the cooling step.

Since the elutriation separation is conveniently carried out at atmospheric pressure, if the elutriation water is boiled the dissolved gases will be stripped out of the water sufficiently to prevent gas bubble formation when the water is used for elutriation, for example, at 150° F. In this embodiment of the invention, therefore, it is prefererd to heat the water to boiling (212° F.) at atmospheric pressure and continue the boiling for from 15 to 30 minutes. This treatment will remove dissolved gases substantially completely so that when the water is cooled and used for elutriation no gas bubbles will form and become selectively attached to the resin particles.

Alternatively and preferably the water is degassed by subjecting it to a lower pressure than the pressure to be used during elutriation while maintaining the temperature substantially the same as that to be used during elutriation. In general, if the pressure is reduced to form 3 to 13 pounds per square inch absolute for from 15 to 30 minutes at the temperature to be employed for elutriation, the water will be sufficiently degassed to prevent gas formation during use in the elutriation.

The silica-alumina cracking catalyst particles have particle sizes in the range associated with catalysts employed in commercial fluid catalytic cracking processes, i.e., from about 20 microns up to 150 microns in diameter, with a small proportion of the catalyst ranging from 150 microns up to 300 microns in diameter. The cation exchange resins as manufactured range in particle size from about 0.3 millimeters (300 microns) to about 1.0 millimeter in diameter with a very few larger particles ranging up to 2.0 millimeters in diameter. Accordingly, the cation exchange resin before being used to contact the catalyst has the smaller particles removed so that the smallest particles employed have a diameter of about 0.4 to 0.5 millimeter.

The silica-alumina catalyst particles and the cation exchange particles are contacted in an aqueous medium preferably at somewhat elevated temperatures, for example, at about 212° F. After the contacting step, the hot aqueous slurry of catalyst particles and resin particles are sent to the elutriation tower for separation. In the tower the hot aqueous slurry is contacted with an ascending aqueous stream having a controlled velocity in order to effect separation of the particles as has been described. If the slurry of catalyst particles and resin particles is at a temperature above 200° F., for example, it is desirable that this slurry come into contact with water in the elutriator which is not cooler than about 150° F. in order to avoid thermal shock to the resin as has been described. At 150° F. it has been found that highly efficient separation of the catalyst particles from the resin particles can be accomplished if the velocity of th ascending aqueous stream in the tower is about 4 feet per minute.

Since the water used for elutriation should be substantially free of ionic impuities, it is recycled with only sufficient make-up water being supplied as required. The sensible heat from the aqueous slurry of catalyst and resin will raise the temperature of the elutriation water slightly, i.e. of the order of 2° to 4° F., as the slurry is mixed with it so that as the water is recycled its temperature will increase unless this extra heat added by the aqueous slurry is removed.

It is necessary to control the elutriation temperature rather closely since in accordance with Stoke's law the settling rates of the particles are affected by the viscosity of the madium in which the particles are settling, and the viscosity of the water is, of course, affected by the temperature. Hence, if the temperature of the water being introduced into the elutriator is increased by the continual addition of heat from the slurry, the settling characteristics of the particles will also change and it will become necessary to change the velocity of the ascending aqueous stream in the elutriator to compensate for the change in settling rates of the particles. Since elutriation towers are designed for a rather narrow range of water velocities, it could become impossible to operate the tower because velocities exceeding those for which it was designated might be required.

It has been found that the water to be used for elutriation can be degassed and its temperature controlled simultaneously, by reducing the pressure on the water to that of the vapor pressure of water at the temperature it is desired to employ during elutriation and allowing a portion of the water to vaporize. During this vaporization the water will be reduced in temperature to the desired operating temperature by what, in essence, is evaporative cooling and simultaneously dissolved gases will be stripped from the water. The actual quantity of water which is required to be vaporized is rather small in order simultaneously to control the temperature and to degas the main body of the water. This quantity ranges from about 0.1 to 1.0 weight percent of the total quantity of water being cooled and degassed, with about 0.2 to 0.4 weight percent being preferred. Thus, for example, if it is desired to carry out the elutriation with water at 150° F., the water before it is introduced into the tower is degassed, by reducing its pressure to the vapor pressure of water at 150° F., i.e. approximately to 190 mm. of mercury absolute. Since the water recycled is at a temperature higher than 150° F., i.e. about 153° F., a portion amounting to about 0.25 weight percent is vaporized thereby reducing the temperature of the main body of water to 150° F., and simultaneously stripping the dissolved gases out of the water. When the water is again subjected to atmospheric pressure in the elutriator no gas bubbles will form in it to hinder the settling of the resin particles.

As has been described a velocity of about 4 feet per minute is satisfactory for a temperature of 150° F., however, the elutriator may be operated at temperatures ranging preferably from 120° F. to 180° F., so that velocities of the ascending aqueous stream may range from about 2 feet per minute to 8 feet per minute.

The following examples are provided to illustrate and describe the invention further, but the invention should not be construed as being limited to the specific conditions employed therein.

*Example I*

A mixture of particles of commercial silica-alumina cracking catalyst which had been used in the cracking of hydrocarbons in a commercial cracking plant, which particles ranged from 20 microns to 300 microns in diameter (1500 grams) and commercial cation exchange resin particles ranging from 400 microns to 2000 microns in diameter (1500 ml. of wet sulfonated copolymer of styrene and divinyl benzene) was introduced into a glass elutriation column provided with a pipe for introducing water at the bottom of the column, a pipe near the bottom of the column through which the settled and separated resin could be withdrawn as an aqueous slurry and an overflow pipe at the top of the tower through which the elutriation water carrying the separated catalyst particles could be withdrawn.

In the first experiment water which had been heated from room temperature to 120° F. was introduced into the column. The gas which was dissolved in the water formed bubbles which selectively attached themselves to the resin particles and caused the resin to be carried up with the catalyst particles so that it was impossible to separate the catalyst particles from the resin particles.

In the second experiment the water was first heated to 160° F. for about 20 minutes and then cooled to 120° F. and thereafter it was introduced into the elutriation tower and was employed for elutriation at 120° F. No bubbles formed in the elutriation water and substantially complete separation of catalyst and resin was accomplished.

*Example II*

A commercial silica-alumina cracking catalyst which had been used in the cracking of hydrocarbons in a commercial cracking plant was contacted with a commercial cation exchange resin at about 212° F. in a commercial catalyst decontamination plant. The catalyst and resin were the same as described in Example I. After contacting, the hot aqueous slurry was transferred to an elutriation tower. The ratio of catalyst to resin was 465 grams of catalyst per 1000 ml. of wet resin and the slurry introduced into the tower had a concentration of about 5 weight percent solids. The temperature of the water introduced into the tower was 150° F. and an upward velocity of 4 feet per minute for the ascending aqueous stream in the tower was maintained. Approximately 280,000 pounds of elutriation water per hour was recycled. This water, prior to bring introduced into the tower, was passed through a degasser wherein an absolute pressure of about 190 mm. of mercury was maintained. At this pressure about 700 pounds per hour of water was vaporized and the temperature of the water was thereby controlled to 150° F. The water thus treated, when employed for elutriation, did not release any gas bubbles so that a highly efficient (over 99 percent) separation of catalyst from resin was accomplished in the tower.

We claim:

1. In the method of aqueous elutriation separation of particles of a silica-alumina cracking catalyst from admixture with particles of a cation exchange resin wherein the mixture of said particles is elutriated with an ascending aqueous stream having a velocity controlled to cause said catalyst particles to move upwardly with the ascending aqueous stream and said resin particles to settle in said stream, the improvement consisting essentially of degassing said aqueous stream at a temperature in the range of from 125° F. to 212° F. prior to elutriating said catalyst particles from said resin particles at a temperature in the range of from 120° F. to 180° F., in an amount sufficient to prevent the free release of gas in said aqueous stream during said elutriating.

2. In the method of aqueous elutriation separation of particles of a silica-alumina cracking catalyst from admixture with particles of a cation exchange resin wherein the mixture of said particles is elutriated with an ascending aqueous stream having a velocity controlled to cause said catalyst particles to move upwardly with the ascending aqueous stream and said resin particles to settle in said stream, the improvement consisting essentially of degassing said aqueous stream prior to elutriating said catalyst particles from said resin particles at a temperature in the range of from 120° F. to 180° F., by heating said aqueous stream to a temperature of at least about 5° F. above the temperature of said elutriating at the pressure of said elutriating for a time sufficient to reach equilibrium gas pressures in said stream and cooling said stream to the temperature of said elutriating.

3. In the method of aqueous elutriation separation of particles of a silica-alumina cracking catalyst from admixture with particles of a cation exchange resin wherein the mixture of said particles is elutriated with an ascending aqueous stream having a velocity controlled to cause said catalyst particles to move upwardly with the ascending aqueous stream and said resin particles to settle in said stream, the improvement consisting essentially of degassing said aqueous stream prior to elutriating said catalyst particles from said resin particles at a temperature in the range of from 120° F. to 180° F., by subjecting said aqueous stream to a pressure ranging from about 3 to 13 pounds per square inch absolute at the temperature of said elutriating for a time sufficient to reach equilibrium gas pressures in said stream and thereafter raising the pressure on said stream to the pressure of said elutriating.

4. In the method of aqueous elutriation separation of particles of a silica-alumina cracking catalyst from admixture with particles of a cation exchange resin wherein the mixture of said particles is elutriated with an ascending aqueous stream having a velocity controlled to cause said catalyst particles to move upwardly with the ascending aqueous stream and said resin particles to settle in said stream, the improvement consisting essentially of subjecting water, at a temperature above the temperature of elutriation separation said elutriation separation temperature being in the range of from 120° F. to 180° F. and prior to its use in said elutriation separation, to a pressure substantially equal to the vapor pressure of water at the temperature of said elutriation separation step for a time sufficient to vaporize from about 0.1 to 1.0 weight percent of the total quantity of water to be cooled and degassed, thereby simultaneously cooling said water to said elutriation separation temperature and degassing said water in an amount sufficient to prevent the free release of gas in said aqueous stream during said elutriation separation step, and thereafter raising the pressure of said water to the pressure of said elutriation separation step.

References Cited by the Examiner
UNITED STATES PATENTS 3,018,890   1/1962   Chuffart _____ 209—158

HARRY B. THORNTON, *Primary Examiner.*

RICHARD A. O'LEARY, *Examiner.*